(12) United States Patent
Buettner (10) Patent No.: US 8,549,320 B2
(45) Date of Patent: Oct. 1, 2013

(54) VERIFYING LOADED MODULE DURING DEBUGGING

(75) Inventor: Kevin A. Buettner, Fountain Hills, AZ (US)

(73) Assignee: Red Hat, Inc., Raleigh, NC (US)

( * ) Notice: Subject to any disclaimer, the term of this patent is extended or adjusted under 35 U.S.C. 154(b) by 1576 days.

(21) Appl. No.: 11/592,345

(22) Filed: Nov. 2, 2006

(65) Prior Publication Data

US 2008/0109793 A1    May 8, 2008

(51) Int. Cl.
 *H04L 29/06* (2006.01)
(52) U.S. Cl.
 USPC .......................................... 713/187; 717/124
(58) Field of Classification Search
 USPC .......... 700/26; 712/227; 717/124; 713/187, 713/201
 See application file for complete search history.

(56) References Cited

U.S. PATENT DOCUMENTS

| 5,845,125 A | * | 12/1998 | Nishimura et al. | 717/129 |
| 6,804,813 B1 | * | 10/2004 | Willems et al. | 717/125 |
| 6,874,054 B2 | * | 3/2005 | Clayton et al. | 710/310 |
| 2002/0078380 A1 | * | 6/2002 | Lin et al. | 713/201 |
| 2004/0015747 A1 | * | 1/2004 | Dwyer | 714/47 |

OTHER PUBLICATIONS

Jacobowitz, Daniel, "Re: verification of remote program," available at http://sourceware.org/ml/gdb/2003-04/msg00286.html, Apr. 24, 2003.
Cagney, Andrew, "Re: verification of remote program," available at http://sourceware.org/ml/gdb/2003-04/msg00303.html, Apr. 24, 2003.

* cited by examiner

*Primary Examiner* — Jeffrey Pwu
*Assistant Examiner* — Thong Truong
(74) *Attorney, Agent, or Firm* — Lowenstein Sandler LLP (57) ABSTRACT

A debugger traps a module load operation and computes a hash of the loaded module. The hash is compared with a hash of a module file, and a warning is issued if the checksums are different. Systems and software implementing similar methods are also described and claimed.

18 Claims, 6 Drawing Sheets

VERIFYING LOADED MODULE DURING DEBUGGING

FIELD

The invention relates to debugging computer programs. More specifically, the invention relates to verifying that multiple entities participating in a debugging session share a consistent view of the instructions and data comprising a computer program.

BACKGROUND

Figure 2:
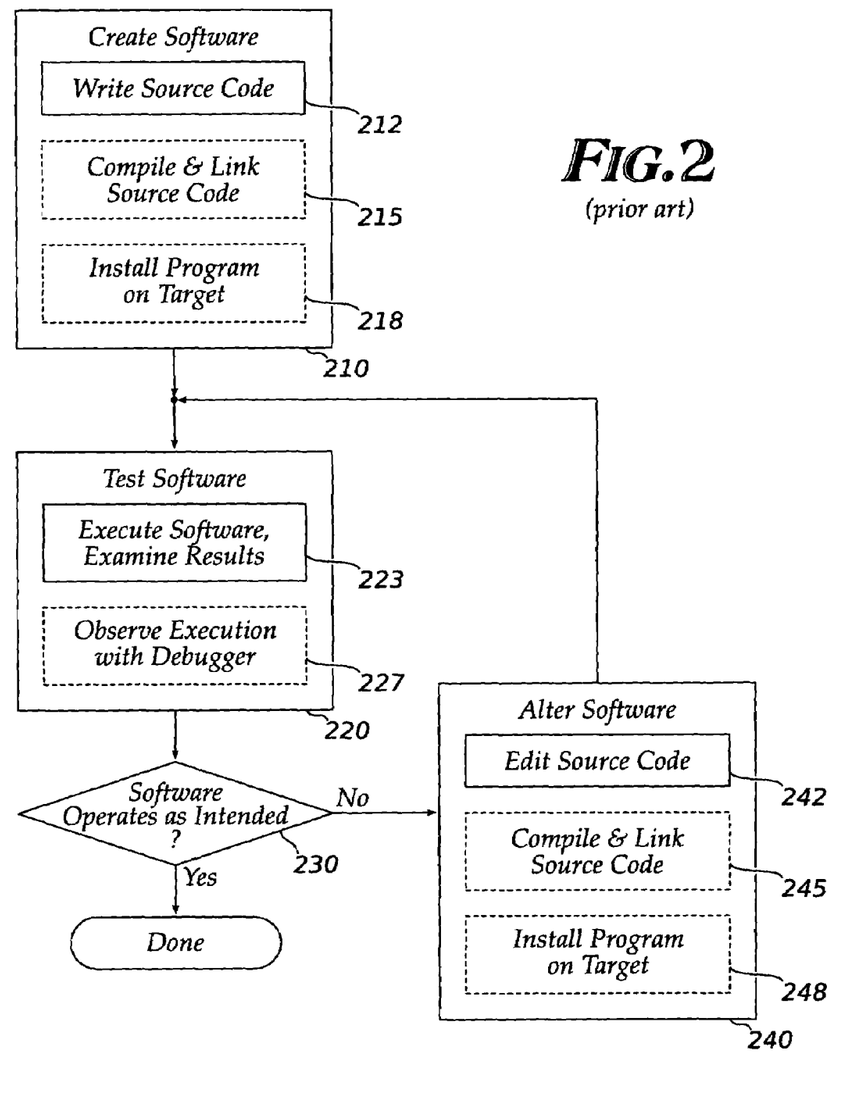
FIG. 2 outlines the general process of producing software.

Software application development is a conceptually simple process. As shown in FIG. 2, a programmer creates the software (210), then tests it (220) to see whether it operates as intended. If the software does not operate as intended (230), the programmer alters the software (240) and tests it again (220). Theoretically, the test/edit cycle will eventually produce the desired application.

Of course, as with many activities, the devil is in the details. For example, creating the software (210) may entail writing source code (212), compiling and linking the source code (215) to prepare binary instructions suitable for execution on a programmable processor, and installing the program on a target machine (218) if the software development occurs on a different system. Testing the software (220) may entail executing the software and examining the results it produces (223), as well as observing the program's execution with a development tool called a debugger (227). The "edit" portion of the cycle (240) may be similar to the "create" portion (210): the programmer may edit the source code (242), compile and link the edited source (245), and re-install the compiled program on a target system (248).

Certain programming styles and environments tend to have a large number of process-related details that can trip up an unwary programmer and delay software development. These details have little to do with the software application itself, but instead are a consequence of the type of application and/or the development environment. For example, applications that use shared or loadable modules, and applications that are written in a cross-development environment (where source code and binaries are prepared on one system, but intended to be executed on a different system), often include several administrative steps in the test/edit cycle which, if not performed correctly, can result in confusing application behavior. Automatic tools to detect errors in these administrative steps can help prevent lost development time.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

DETAILED DESCRIPTION

Embodiments of the invention trap module load operations and compute a hash or checksum of the loaded module. Hashes are compared to verify that all cooperating software applications are using the same version of the module. Mismatches are reported to the user.

Figure 1:
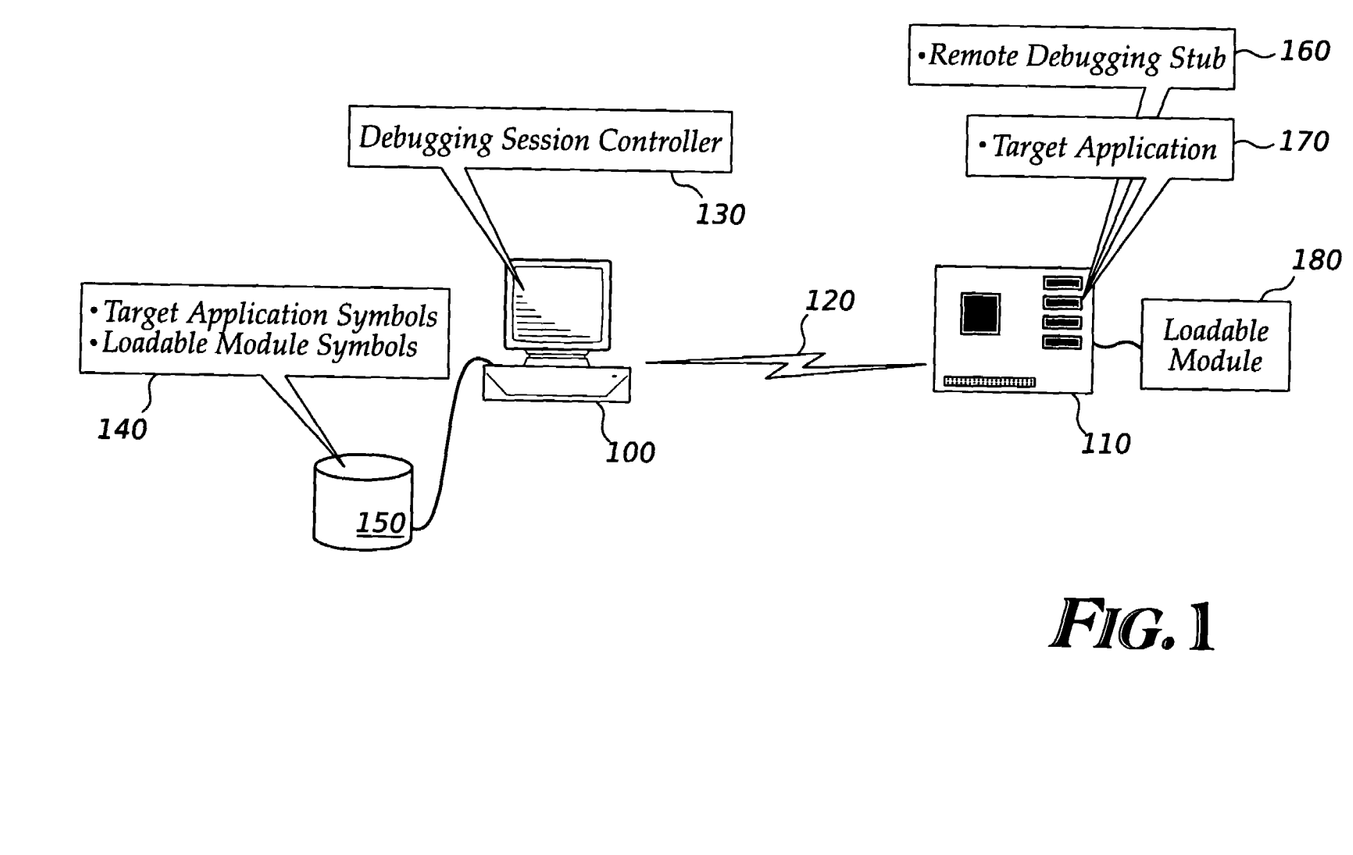
FIG. 1 shows a software development environment where an embodiment of the invention can be used.

FIG. 1 shows an exemplary software development environment where an embodiment of the invention can be used. A development computer system 100 is used by a programmer (not shown) to create and edit the source code of a computer application. The source code is compiled and linked to produce an executable or "binary" program that is to run on a target system 110. Target system 110 may be, for example, an embedded system such as a set-top box, a portable media player, a personal digital assistant ("PDA"), or another similar system. Such target systems sometimes lack a full software development and debugging system that can be run natively (i.e. on the device itself), so a "cross" development computer system 100 is used to prepare binaries which are then installed on the target system for testing. Communication link 120 is used to send the executable program to the target system 110, and to observe and control the operation of the target system while the program is tested.

During testing, a debugging session controller 130 operates on development system 100, and interacts over communication link 120 with a remote debugging stub 160 that is associated with target application 170, executing on target system 110. The target application may, during its operations, load a loadable module 180 from secondary storage. If this happens, it is important for debugging session controller 130 to have access to up-to-date information describing the loadable module 180, so that it can present an accurate picture of the target application's operations to the programmer. Symbol information describing the target application and loadable module's symbols 140 is stored on a storage device 150, accessible to the debugging session controller 130. Embodiments of the invention help ensure that the target application symbols and loadable module symbols 140 are consistent with the target application 170 and loadable module 180 on the target system 110.

Figure 3A:
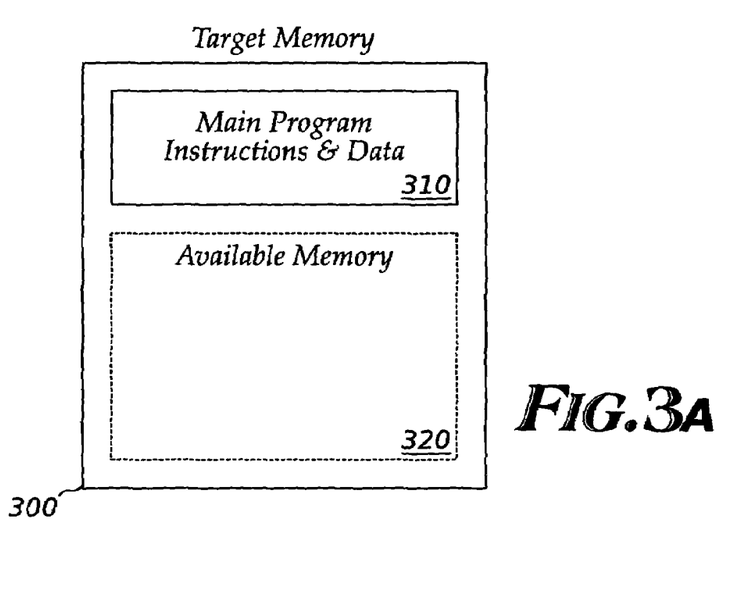
FIGS. 3A and 3B show contents of a computer system memory before and after a loadable module is loaded.

FIG. 3A shows a logical view of the contents of memory 300 on target system 110. Target memory 300, which may be a Random Access Memory ("RAM"), Read-Only Memory ("ROM"), or similar memory, contains the instructions and data 310 for an application program. A programmable processor in the target system 110 executes the instructions to perform the application's functions. As shown in FIG. 3A, target memory 300 is not completely filled by the main program instructions and data 310—some memory 320 is available for the program's use.

Figure 3B:
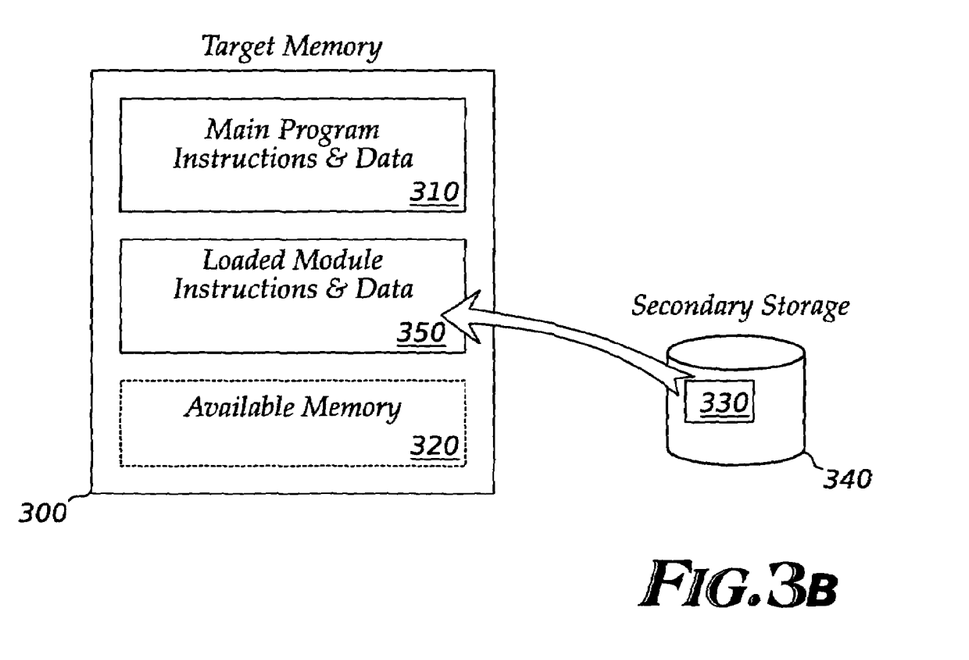

As the target application executes, it may load a module from a secondary storage volume. FIG. 3B shows how target memory 300 may change in this event. The target memory 300 may still contain the main program instructions and data 310, but some of the available memory is used to hold instructions and data of a loaded module 350, which has been copied to a portion of available memory from a location 330 on a secondary storage device 340. (After loading the module, available memory 320 is reduced in size, as shown.) Secondary storage device 340 may be a mass storage device such as a hard disk, a Secure Digital ("SD") Flash memory card, or another nonvolatile storage medium. Alternatively, secondary storage device 340 may be a designated area within target memory 300. Loadable module 330 may be stored in a form that is suitable for copying directly into available memory 320 when its instructions and data are needed, or it may be stored in a compressed and/or encrypted form that must be expanded and/or decrypted before being placed in available memory 320.

Loadable modules may contain instructions and data specifically designed for use by a particular application, or may contain instructions and data to implement functions of general applicability. In the latter case, the loadable module is often called a shared library or a dynamically linked library ("DLL"). Both special-purpose and general-purpose loadable modules or libraries can be verified by embodiments of the invention.

Figure 4:
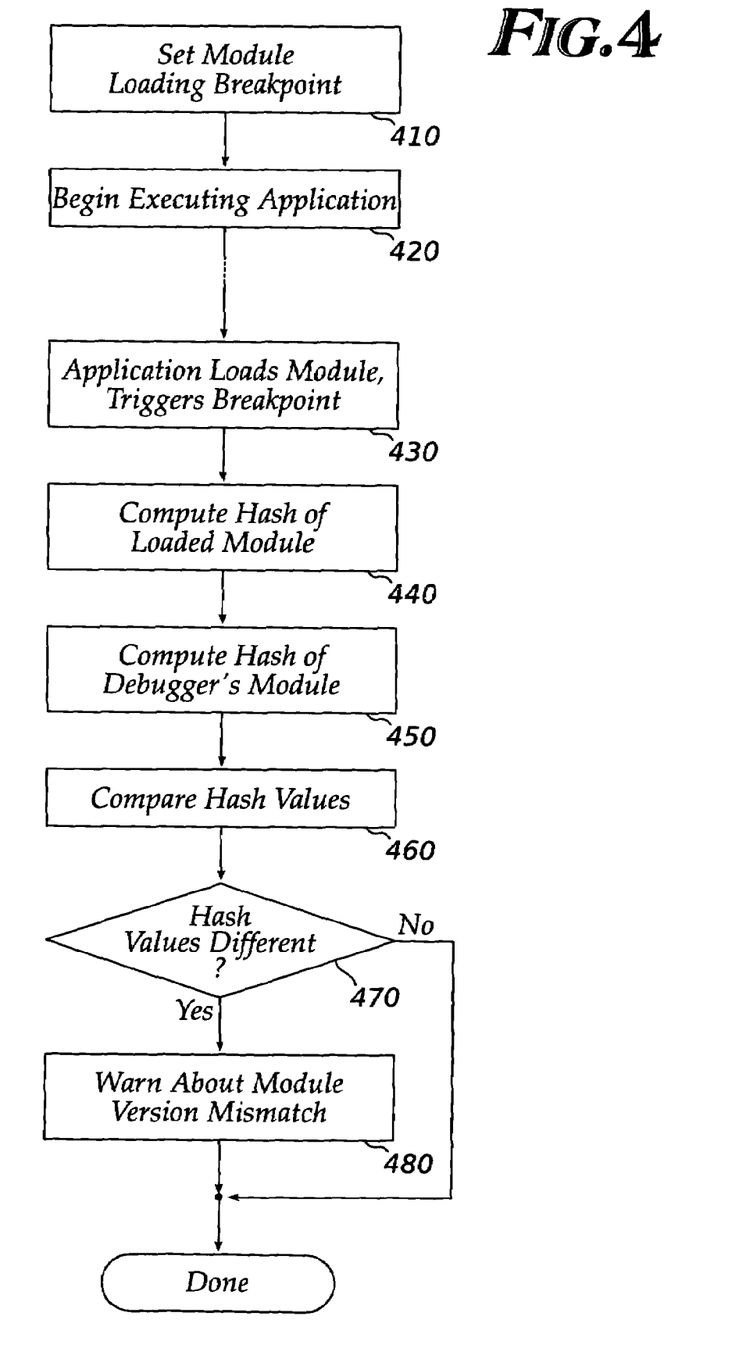
FIG. 4 outlines operations according to an embodiment of the invention.

FIG. 4 outlines a process by which an embodiment of the invention can help detect time-consuming administrative errors during program development. After creating, compiling and installing a version of the program under development, the programmer launches the program under the control of a debugger (these actions are not shown in FIG. 4). Before the program begins executing, the debugger automatically sets a breakpoint to trap a module load operation (410). The application begins to execute (420), and eventually may load a module, which triggers the previously-set breakpoint (430) and transfers control to the debugger. The debugger computes a hash of the loaded module (440), and also computes a hash of a module accessible within the debugger's environment (450). The two hash values are compared (460), and if the hash values are different (470), the debugger warns the programmer about a possible module version mismatch. Note that in a cross-development environment, some of the logical functions of the debugger may be performed by a first (controlling) portion of the debugger executing at the development system, and other logical functions may be performed by a second (remote) portion of the debugger executing at the target system. For example, the remote debugger may compute the hash of the loaded module, since it has easy access to the module in the target's memory, while the debugging controller may compute the hash of the module in a file that is accessible within the controlling debugger's environment. In this case, two module hash computations might occur substantially simultaneously, and the remote debugger would transmit the hash value it computed across a communication channel to the controlling debugger.

The loaded module and the module accessible within the debugger's environment are expected to be identical, and if they are, the hash values will be equal. However, if the programmer made a mistake while compiling and/or installing the application and module to the target system, it is possible that the module intended to be tested during the debugging session is not the module actually loaded by the target application. In this case, the warning emitted in block 480 can alert the programmer to the mistake and prevent confusion and time wasted investigating why the loaded module does not behave as expected.

Software operations as outlined above can help detect administrative errors that occur during the edit/compile/test software development cycle. For example, if the programmer changes the source code of the module and recompiles the module, but fails to place the newly-compiled module in the correct location on the target, then when the target application attempts to load the module, it may inadvertently load an outdated copy of the module that does not contain the programmer's new changes. Without the module hash value checking and version mismatch warning, the programmer might waste time trying to determine why the loaded module did not behave as expected in light of the new changes.

The embodiment described with reference to FIG. 4 uses a common debugging facility, the breakpoint, to detect when a module is loaded. Other methods of detecting module loads may be used instead. For example, if the module loading logic can detect the debugging stub, then it may notify the stub of a load operation through an interprocess communication mechanism (e.g. message passing, semaphore, or data structure in shared memory). In addition, the message protocol used to communicate between the debugging stub and debugging session controller could define a specific message to indicate that a module load had occurred, rather than "overloading" the breakpoint message to mean "maybe a breakpoint, and maybe a module load operation." The module-loaded message could even include the calculated hash value. The particular method used to detect module loads is not important, as long as the loaded module can be examined and a hash computed before the module is changed. (If the module is changed before the hash is computed, then the hash value will not match the value computed at the debugging controller's side, and a possibly-spurious warning will be generated.)

Figure 5:
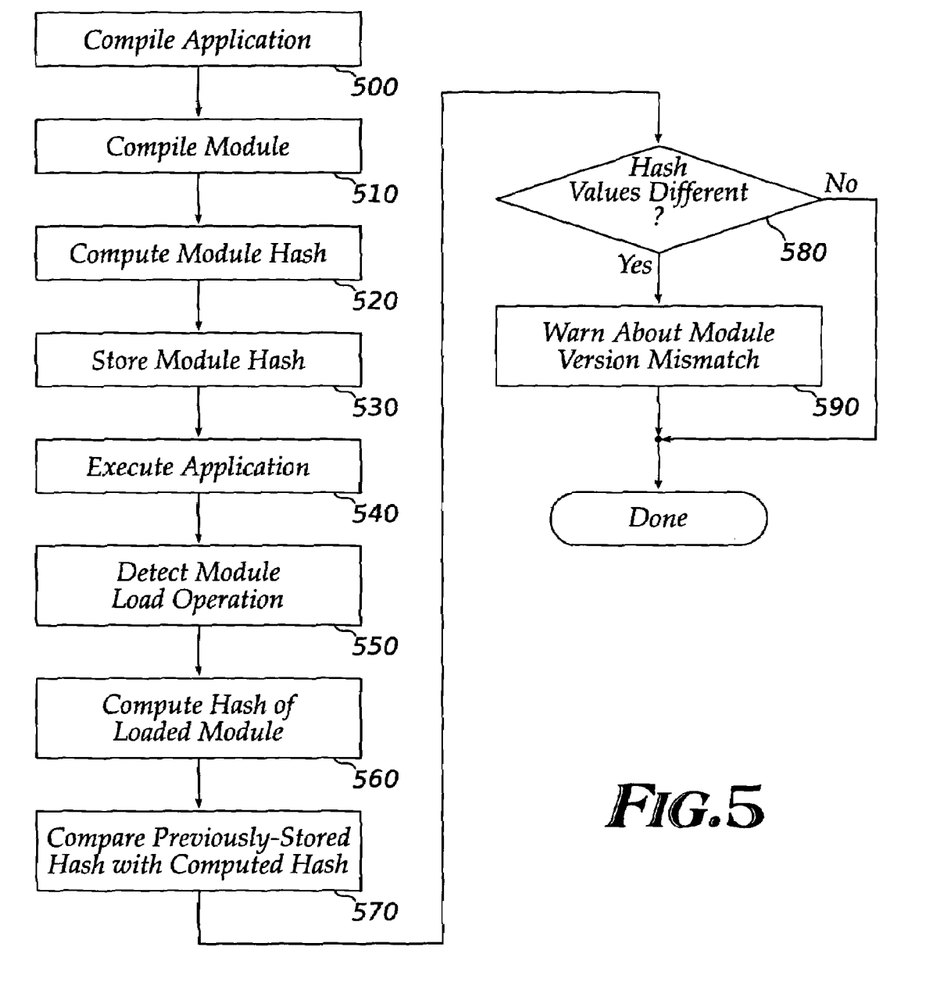
FIG. 5 describes operations according to another embodiment of the invention.

Module hash values can also be used to detect unexpected module versions even outside of the application debugging context. For example, an application might be prepared to operate correctly with a first version of a loadable module. Later, a second application might be installed that overwrites the loadable module with a newer version of the module. The newer version might cause the first application to operate incorrectly. FIG. 5 shows how an embodiment of the invention can detect the unexpected module version and produce a warning to alert a user that erratic operation may occur.

The application is compiled (500) and the loadable module is compiled (510). A hash of the loadable module is computed (520) and stored (530). The hash may be stored in (or with) the compiled application, or in a separate file or database where it can be retrieved later.

When the application is executed (540), module load operations are detected (550). Since in this embodiment, a debugger may not be involved, a different mechanism for detecting module load operations is used. Here, instead of a breakpoint, a function the application calls to load a module is augmented with instructions to perform the following operations. After the module is loaded, a hash of the loaded module is computed (560). The computed hash value is compared with the previously-stored hash value (570), and if the hash values are different (580), a warning is emitted to alert the user (590).

In this embodiment, the first hash value is computed at or near the time the module is compiled, while the second hash value is computed (and checked) every time the application loads the module.

The methods described with reference to FIGS. 4 and 5 can be implemented with sequences of instructions to cause a programmable processor to perform the operations described. Alternatively, hard-wired circuitry can be used to perform some or all of the operations. Embodiments may also combine sequences of instructions ("software") with fixed circuitry to perform the operations.

Figure 6:
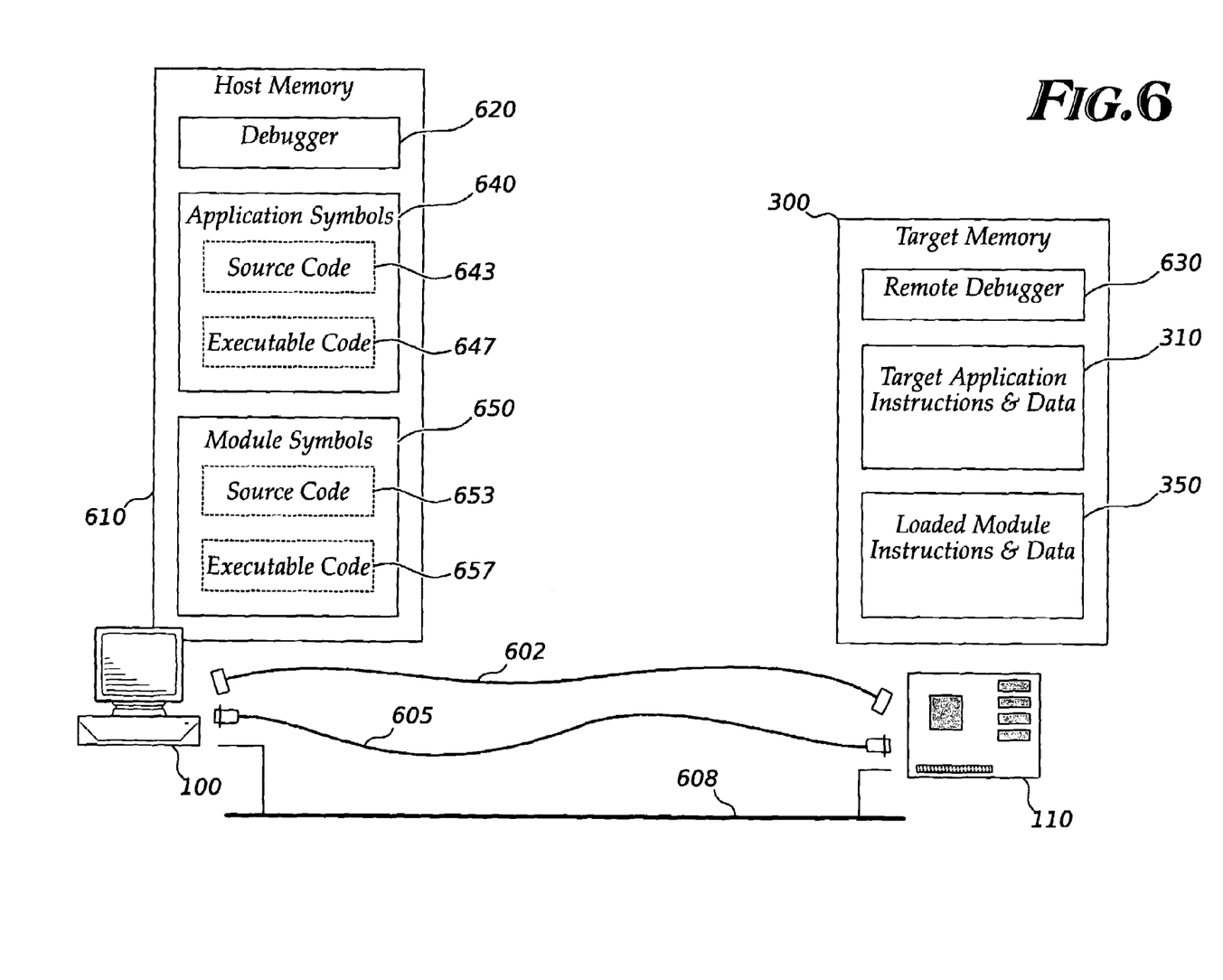
FIG. 6 shows additional details of a software development environment using an embodiment of the invention.

FIG. 6 shows additional details of the software development environment of FIG. 1. Development system 100 and target system 110 may communicate over a range of different communication channels. For example, a Joint Test Action Group ("JTAG") boundary scan connection 602 may carry data between the systems, a serial connection 605 may serve a similar purpose, or a data communication network such as an Ethernet network 608 may permit communication between development system 100 and target system 110. If a data communication network is used, the host and target may communicate according to the Transmission Control Protocol ("TCP") or User Datagram Protocol ("UDP"), both of which transmit data in packets according to the Internet Protocol ("IP"). It is appreciated that network data communications permit the host and target systems to be separated by an arbitrary geographic distance (as opposed to JTAG and serial connections, which may be limited to only a few meters or tens of meters).

In the memory 610 of development host system 100, debugger software 620 presents information about the execution of the target application on target system 110 and accepts commands from the programmer. Debugger 620 may refer to application symbols 640 and module symbols 650 stored in memory 610. Source code and executable code for the target application (643, 647) and the loadable module (653, 657) may also be stored in host memory 610 for the use of debugger 620.

Target memory 300 of target system 110 contains the instructions and data of the target application 310 and the instructions and data of the loaded module 350. Target memory 300 also contains instructions and data to implement a remote debugger stub 630, which interacts or cooperates with debugger 620 to permit the programmer to observe and control the target application on the target system 110. Remote debugger stub 630 also performs some of the operations described above according to an embodiment of the invention. For example, remote debugger stub 630 may automatically set breakpoints at module loading functions, detect the module load operations, compute the hash value of the loaded module, and transmit the computed hash value to cooperating, controlling debugger 620.

Although the operations of embodiments of the invention have been described in the context of a cross-development environment where software is prepared on a development machine and then installed on a target machine for testing, embodiments can also be used when development and testing occur on the same machine. Some computer systems, such as Unix and Unix-like systems, and Windows® systems, use a complex module loading process where loadable modules requested by an application are located by searching in a number of different locations. Often, the first module found in this search is loaded, even when a continued search might disclose a more-recent version of the module. Thus, a programmer working on a software application might modify a loadable module but inadvertently install it in a location from which it will never be loaded (because, for example, an older module of the same name is encountered earlier in the search). An embodiment of the invention can compute and compare hash values or checksums of the modules to detect when the debugger and target application are using inconsistent versions of the module. The programmer can be alerted and can take corrective action to ensure that the desired module is loaded.

A hash value is a value computed based on one or more input data values. The computation preferably is chosen so that any difference in input data values results in a different hash value. Some hash values are considered cryptographically secure. That is, any change in an input value results in a different hash value; and furthermore, it is computationally infeasible to find a second set of input values that results in the same hash value. One commonly-used hash algorithm is called Message Digest 5, or "MD5." Another commonly-used hash algorithm is called Secure Hash Algorithm-1, or "SHA-1." A checksum (the sum of the series of input data values) is a simple hash value, but most checksums are not cryptographically secure. For many environments in which an embodiment of the invention is used, cryptographic security is unnecessary. However, efficient source code to compute cryptographically secure hash values is commonly available, so such hash algorithms may be convenient to use. In this Application, the generic terms "hash" and "hash value" are used to indicate a value that can be computed over the bytes of a loadable module (including a shared library or DLL) and compared with another similarly-computed value to determine whether two loadable modules or libraries are identical.

An embodiment of the invention may be a machine-readable medium having stored thereon instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The applications of the present invention have been described largely by reference to specific examples and in terms of particular allocations of functionality to certain hardware and/or software components. However, those of skill in the art will recognize that loadable module verification can also be achieved by software and hardware that distribute the functions of embodiments of this invention differently than herein described. Such variations and implementations are understood to be captured according to the following claims.

I claim:

1. A method comprising:
    identifying, by a debugger running on a host computer system, a target application installed on a target computer system, the target computer system coupled to the host computer system via a network;
    detecting, by the debugger, a module load operation that loads into main memory, during execution of the target application on the target computer system, a module that is external to the target application and that is used by the target application;
    comparing, by the debugger, a first hash of the module with a second hash of a version of the module stored in a file on a storage device of the host computer system; and
    emitting a warning when the first hash differs from the second hash.

2. The method of claim 1 wherein the first hash and the second hash are checksums.

3. The method of claim 1 wherein the first hash and the second hash are Message Digest-5 ("MD5") hashes.

4. The method of claim 1 wherein the first hash and the second hash are Secure Hash Algorithm-1 ("SHA-1") hashes.

5. The method of claim 1 further comprising computing the first hash and computing the second hash substantially simultaneously.

6. The method of claim 1 further comprising:
    computing the first hash when the module is loaded; and
    computing the second hash when the module is compiled.

7. The method of claim 1 wherein the module loaded by the module load operation is a shared library.

8. The method of claim 1, further comprising:
    transmitting the first hash from the target computer system to the host computer system.

9. The method of claim 1, further comprising at least one of:
    uncompressing the module; or
    decrypting the module.

10. The method of claim 1 wherein the detecting comprises:
    setting a breakpoint at a module load function; and
    detecting the module load operation if the breakpoint is triggered.

11. A system comprising:
    a processor to:
        detect a module load operation that loads into a main memory of a target computer system, during execution of a target application on the target computer system, a module that is external to the target application and that is used by the target application, and
        compare a first hash of the module with a second hash of a version of the module stored in a file, and
        emit a warning when the first hash differs from the second hash; and a storage device to store the file.

12. The system of claim 11 wherein the processor is further to:
    compute the first hash when the module is loaded, and
    compute the second hash when the module is compiled.

13. The system of claim 11 wherein a copy of the module is stored on a storage device of the target computer system.

14. The system of claim 13 wherein the storage device of the target computer system is a Secure Digital ("SD") Flash memory card.

15. A non-transitory computer-readable storage medium containing executable instructions to cause a host computer system to perform operations comprising:
    detecting, by the host computer system, a module load operation that loads into a main memory of a target computer system, during execution of a target application on the target computer system, a module that is external to the target application and that is used by the target application;
    comparing, by the host computer system, a first hash of the module with a second hash of a version of the module stored in a file on a storage device of the host computer system; and
    emitting a warning when the first hash differs from the second hash.

16. The non-transitory computer-readable storage medium of claim 15 wherein the detecting comprises installing a breakpoint at a module loading function.

17. The non-transitory computer-readable storage medium of claim 15 wherein the detecting comprises augmenting a module loading function with instructions to cause the module loading function to compute the first hash.

18. The non-transitory computer-readable storage medium of claim 15 wherein the first hash is one of a checksum, a Message Digest-5 ("MD5") hash, or a Secure Hash Algorithm-1 ("SHA-1") hash.

* * * * *